United States Patent
Schroeder

(10) Patent No.: US 6,469,497 B2
(45) Date of Patent: Oct. 22, 2002

(54) MAGNETIC POSITION SENSOR SYSTEM COMPOSED OF TWO REFERENCE MAGNETORESISTORS AND A LINEAR DISPLACEMENT SENSING MAGNETORESISTOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/757,223

(22) Filed: Jan. 9, 2001

(65) Prior Publication Data
US 2002/0089325 A1 Jul. 11, 2002

(51) Int. Cl.⁷ .......................... G01B 7/00; G01R 33/025
(52) U.S. Cl. ........................ 324/207.12; 324/207.21; 324/207.24
(58) Field of Search ................. 324/207.12, 207.21, 324/207.24, 252, 235, 173, 174; 338/32 R

(56) References Cited

U.S. PATENT DOCUMENTS

| | | | |
|---|---|---|---|
| 4,835,467 A | | 5/1989 | Gokhale ...................... 324/166 |
| 4,926,122 A | | 5/1990 | Schroeder et al. ..... 324/207.13 |
| 4,939,456 A | | 7/1990 | Morelli et al. .......... 324/207.21 |
| 5,327,077 A | * | 7/1994 | Honda ................... 324/207.21 |
| 5,351,003 A | * | 9/1994 | Bauer et al. ........... 324/207.12 |
| 5,570,016 A | | 10/1996 | Schroeder et al. ..... 324/207.25 |
| 5,585,719 A | * | 12/1996 | Endo et al. ................. 324/235 |
| 5,731,702 A | | 3/1998 | Schroeder et al. ..... 324/207.21 |
| 5,754,042 A | | 5/1998 | Schroeder et al. ..... 324/207.25 |

* cited by examiner

Primary Examiner—Edward Lefkowitz
Assistant Examiner—Subhash Zaveri
(74) Attorney, Agent, or Firm—Margaret A. Dobrowitsky

(57) ABSTRACT

A position sensor system capable of self compensation over wide temperature ranges, air gaps and tilts. Three matched MRs are aligned in the direction of movement of a magnetic target. The middle MR is the position sensor, and the two outer MRs serve as reference sensors which sense the magnetic field at the limits of the position sensing range. The cooperating magnetic target assures that one of the two outer MR elements is always exposed to some maximum magnetic field, $B_{MAX}$, corresponding to a position $X_{MAX}$, and the other MR element is always exposed to some minimum magnetic field, $B_{MIN}$, corresponding to a position $X_{MIN}$, such that $B_{MIN} \leq B_X \leq B_{MAX}$, corresponding to $X_{MIN} \leq X \leq X_{MAX}$, where $B_X$ is the magnetic field measured by the middle MR and varies with the position, X, of the target. The actual position, X, is computed assuming a linear relation between MR resistance in the magnetic field range from $B_{MIN}$ to $B_{MAX}$ and the position, X, of the target. This is accomplished by making the magnetic field a linear function of position in the range $X_{MIN}$ to $X_{MAX}$ and using MRs whose resistance is a linear function of magnetic field in the range $B_{MIN}$ to $B_{MAX}$.

11 Claims, 3 Drawing Sheets

MAGNETIC POSITION SENSOR SYSTEM COMPOSED OF TWO REFERENCE MAGNETORESISTORS AND A LINEAR DISPLACEMENT SENSING MAGNETORESISTOR

TECHNICAL FIELD

The present invention relates to a method of sensing position using magnetoresistors.

BACKGROUND OF THE INVENTION

It is well known in the art that the resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object moving relative and in close proximity to the MR, such as a toothed wheel, produces a varying magnetic flux density through the MR, which, in turn, varies the resistance of the MR. The MR will have a higher magnetic flux density and a higher resistance when a tooth of the moving target wheel is adjacent to the MR than when a slot of the moving target wheel is adjacent to the MR.

Increasingly more sophisticated spark timing and emission controls introduced the need for crankshaft sensors capable of providing precise position formation during cranking. Various combinations of magnetoresistors and single dual track toothed or slotted wheels (also known as encoder wheels and target wheels) have been used to obtain this information (see for example U.S. Pat. Nos. 570,016, 5,731,702, and 5,754,042).

The shortcoming of MR devices is their temperature sensitivity. They have a negative temperature coefficient of resistance and their resistance can drop as much as 50% when heated to 180 degrees Celsius. Generally, this led to the use of MR devices in matched pairs for temperature compensation. Additionally, it is preferable to drive MR devices with current sources since, with the same available power supply, the output signal is nearly doubled in comparison with a constant voltage source.

To compensate for the MR resistance drop at higher temperatures, and thus, the magnitude decrease of the output signal resulting in decreased sensitivity of the MR device, it is also desirable to make the current of the current source automatically increase with the MR temperature increase. This is shown in U.S. Pat. No. 5,404,102 in which an active feedback circuit automatically adjusts the current of the current source in response to temperature variations of the MR device. It is also known that air gap variations between the MR device and ferromagnetic materials or objects will affect the resistance of MR devices with larger air gaps producing less resistance and decreased output signals.

What is needed is a position sensor capable of self compensation over wide ranges of temperature and air gaps, including tilts.

SUMMARY OF THE INVENTION

The present invention is a position sensor system capable of self compensation over wide temperature ranges and air gaps, including tilts. It employs three matched MRs (also commonly referred to as MR elements) with either one common bias magnet or separate bias magnets. The MRs are aligned in the direction of movement of a magnetic target. The middle MR is the actual position sensor. The two outer MRs serve as reference sensors which sense the magnetic field at the limits of the position sensing range. The cooperating magnetic target assures that one of the two outer MR elements is always exposed to some maximum magnetic field, $B_{MAX}$, corresponding to a position $X_{MAX}$, and the other MR element is always exposed to some minimum magnetic field, $B_{MIN}$, corresponding to a position $X_{MIN}$, such that $B_{MIN} \leq B_X \leq B_{MAX}$, corresponding to $X_{MIN} \leq X \leq X_{MAX}$, where $B_X$ is the magnetic field measured by the middle MR and varies with the position, X, of the target.

The actual position, X, is computed assuming a linear relation between MR resistance in the magnetic field range from $B_{MIN}$ to $B_{MAX}$ and the position, X, of the target. This is accomplished by making the magnetic field a linear function of position in the range $X_{MIN}$ to $X_{MAX}$ and using MRs whose resistance is a linear function of magnetic field in the range $B_{MIN}$ to $B_{MAX}$.

Alternatively, the shape of the magnetic field profile can be tailored to the MR characteristics in the operating magnetic field range $B_{MIN}$ to $B_{MAX}$ to yield the desired linear relation between MR resistance and position X. That is, the sensor always operates on the linear part of the MR resistance versus magnetic field characteristic curve in the magnetic field range $B_{MIN}$ to $B_{MAX}$.

Accordingly, it is an object of the present invention to provide a magnetic position sensor system capable of self compensation over wide ranges of temperatures, air gaps and tilts.

DETAILED DESCRIPTION OF THE PREFERRED EMBODIMENT

Figure 1:
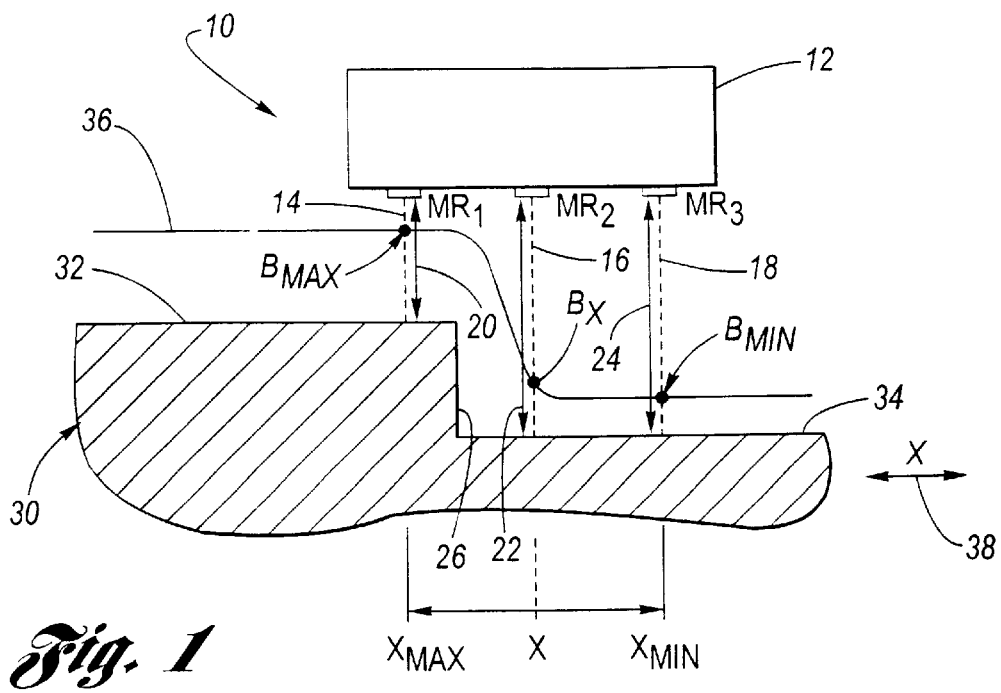
FIG. 1 depicts an example of the preferred environment of use of the present invention.

FIG. 1 depicts an example of the preferred environment of use of the present invention. The single MR sensor 10, preferably stationary, employs three magnetoresistors, MR1, MR2, and MR3, which are biased by a permanent magnet 12, wherein the magnetic flux 14, 16, and 18 emanating therefrom are represented by the dashed arrows. The magnetic flux 14, 16, and 18 pass from the permanent magnet 12 through the magnetoresistors MR1, MR2, and MR3 and through the air gaps 20, 22, and 24 to the target 30.

The matching of MR1, MR2, and MR3 ensures that the sensing elements are equally affected by temperature and air gap and that the resistance of each MR is the same for the same magnetic field exposure. If the magnetic field is a linear function of position, then the resistance of MR1, MR2, and MR3 will be linear functions of magnetic field and position also and, by properly designing an electric circuit, the MR output voltages will also be linear functions of resistance and position.

The target 30 is made of a magnetic material (for example a ferromagnetic material), having in this example a tooth 32, a selectively shaped tooth edge profile 26, and a space 34, and is designed to have the magnetic field profile 36 which is conveyed with the target as the target moves. The target 30 may have other configurations besides that shown in FIG. 1 and may be appropriately shaped to provide any desirable magnetic field profile similar to the magnetic field profile 36. The target 30 moves in the X direction 38 and is constrained to move in a known range having a maximum value $X_{MAX}$ and a minimum value $X_{MIN}$. The magnetic profile 36 in conjunction with the constricted range of movement of the target between $X_{MIN}$ and $X_{MAX}$ ensures that MR1 is always exposed to $B_{MAX}$ and MR3 is always exposed to $B_{MIN}$ whereas MR2 is exposed to $B_{MIN}$ when it is at the position $X_{MIN}$ and to $B_{MAX}$ when it is at the position $X_{MAX}$ wherein MR2 is exposed to a magnetic field $B_X$, where $B_{MIN} \leq B_X \leq B_{MAX}$, at the position X, where $X_{MIN} \leq X \leq X_{MAX}$, having a magnetic profile which is a linear function of position between $X_{MIN}$ and $X_{MAX}$.

Figure 2:
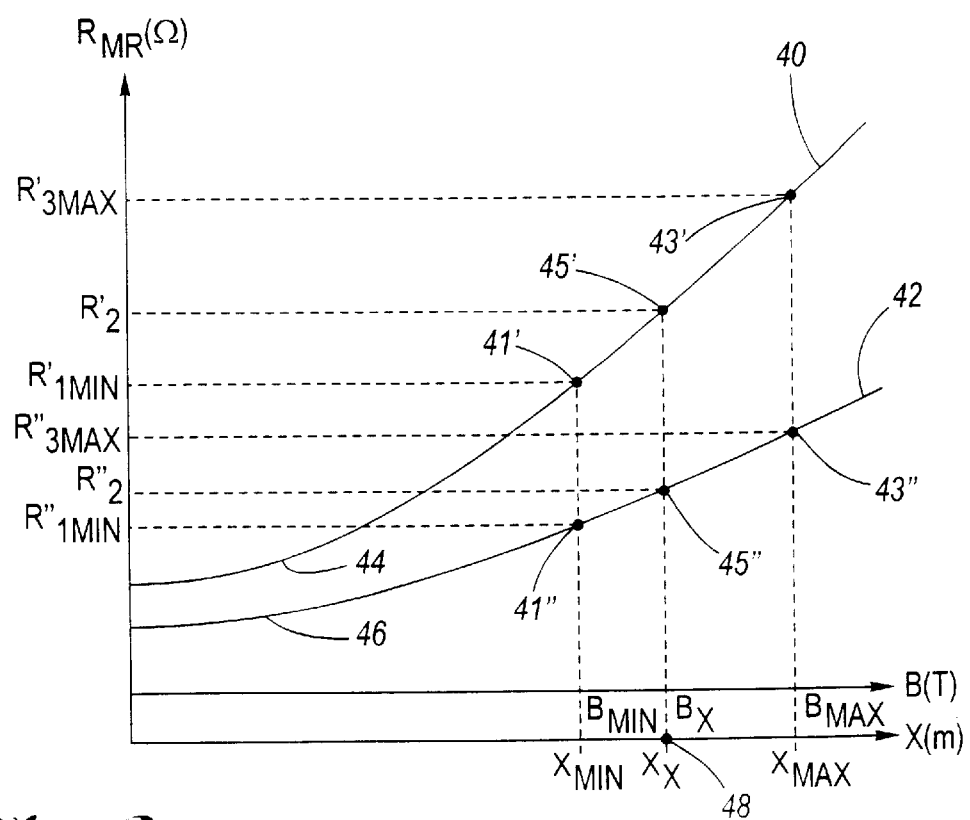
FIG. 2 depicts a plot of MR resistance versus magnetic field and position according to the present invention.

FIG. 2 depicts a plot of MR resistance versus magnetic field and MR resistance versus position according to the present invention. The target 30 is designed and appropriately shaped such that the magnetic field range between $B_{MIN}$ and $B_{MAX}$ falls on the linear part 40 at low temperatures, or the linear part 42 at high temperatures, and not around the respective parabolic regions 44 or 46 of the magnetic field plot of FIG. 2 by which the magnetic field is a linear function of position and by which the resistance of MR1, MR2, and MR3 are linear functions of magnetic field and position also. It can be seen from FIG. 2 that the magnetic field range remains in the linear region as the temperature varies. That is, the linearity of the magnetic field is stable as the temperature varies. It can also be seen in FIG. 2 that the MR resistances vary widely at different temperatures such as $R'_{1MIN}$ at point 41' at a low temperature and $R''_{1MIN}$ at point 41" at a high temperature, wherein $R'_{1MIN}$ is the resistance of MR1 at $X_{MIN}$ at a low temperature and $R''_{1MIN}$ is the resistance of MR1 at $X_{MIN}$ at a high temperature. Similarly, $R'_{3MAX}$ at point 43' is the resistance of MR3 at $X_{MAX}$ at a low temperature and $R''_{3MAX}$ at point 43" is the resistance of MR3 at $X_{MAX}$ and $R_2'$ at point 45' is the resistance of MR2 at $X_X$ at a low temperature and $R_2''$ at point 45" is the resistance of MR2 at $X_X$. As shown in FIG. 2, the position measurement of $X_X$ at point 48 is not affected even with widely varying resistances at different temperatures. A similar plot can be ascribed to MR resistance versus air gap. A change in air gap will not affect the position measurement of $X_X$ as long as the region between $B_{MIN}$ and $B_{MAX}$ is on a linear part of the MR resistance curve such as 40 and 42 in FIG. 2. A smaller air gap would simply shift the MR resistance values toward higher magnetic field values while a larger air gap would simply shift the MR resistance values toward lower magnetic field values.

From FIG. 2, it can be deduced that:

$$(X_X-X_{MIN})/(X_{MAX}-X_{MIN})=(B_X-B_{MIN})/(B_{MAX}-B_{MIN})=(R_2-R_3)/(R_1-R_3) \quad (1)$$

where $R_1$, $R_2$, and $R_3$ are the resistances of MR1, MR2, and MR3, respectively, at an arbitrary temperature. By properly designing an electric circuit, the MR output voltages will also be linear functions of resistance and position and equation (1) above may be equated to $(V_{MR2}-V_{MR3})/(V_{MR1}-V_{MR3})$ where $V_{MR1}$, $V_{MR2}$, and $V_{MR3}$ are the voltages across MR1, MR2, and MR3, respectively. Therefore, from the above relationships:

$$X_X=X_{MIN}+(X_{MAX}-X_{MIN})(R_2-R_3)/(R_1-R_3) \quad (2)$$

and $$X_X=X_{MIN}+(X_{MAX}-X_{MIN})(V'_{MR2}-V'_{M3})/(V'_{MR1}-V'_{MR3}). \quad (2')$$

By proper design, $X_{MIN}$ may be set to zero resulting in simplified equations (3) and (3'):

$$X_X=(X_{MAX}-X_{MIN})(R_2-R_3)/(R_1-R_3) \quad (3)$$

and $$X_X=(X_{MAX}-X_{MIN})(V'_{MR2}-V'_{MR3})/(V'_{MR1}-V'_{MR3}). \quad (3')$$

Figure 3:
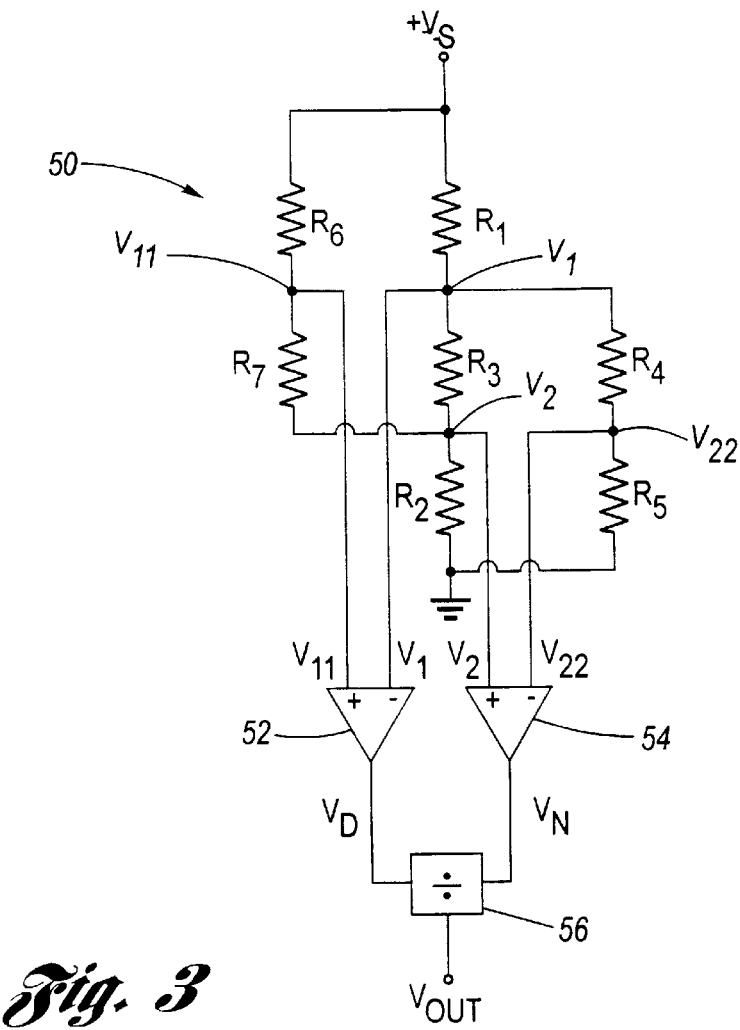
FIG. 3 shows an example of an analog circuit implementing the present invention.

FIG. 3 shows an example of an analog circuit 50 implementing the present invention. In FIG. 3, $R_4$, $R_5$, $R_6$, and $R_7$ have, preferably, the same value, say R, such that $R >> R_1 > R_2 > R_3$ where $R_1$, $R_2$, and $R_3$ are the resistances of MR1, MR2, and MR3, respectively. Under these conditions:

$$V_1=(R_2+R_3)/(R_1+R_2+R_3)*V_S \quad (4)$$

$$V_2=R_2/(R_1+R_2+R_3)*V_S \quad (5)$$

$$V_{11}=(V_S+V_2)/2=(1+R_2/(R_1+R_2+R_3))*(V_S/2) \quad (6)$$

and $$V_{22}=V_1/2=(R_2+R_3)/(R_1+R_2+R_3)*(V_S/2) \quad (7)$$

where $V_S$ is the power supply voltage and $V_1$, $V_2$, $V_{11}$, and $V_{22}$ are the voltages at the nodes shown in FIG. 3.

The output $V_D$ of differential amplifier 52 (i.e. an OP AMP) is:

$$V_D=V_{11}-V_1=(V_S/2)*((R_1-R_3)/(R_1+R_2+R_3)) \quad (8)$$

and the output $V_N$ of differential amplifier 54 is:

$$V_N=V_2-V_{22}=(V_S/2)*((R_2-R_3)/(R_1+R_2+R_3)) \quad (9)$$

whereby the output $V_{OUT}$ of analog divider 56 is:

$$V_{OUT}=K*(V_N/V_D)=K*(R_2-R_3)/(R_1-R_3) \quad (10)$$

wherein K is the gain of analog divider 56 and is adjusted for maximum sensitivity or K is adjusted to satisfy other system requirements. For example, K may be adjusted such that $V_{OUT}$ has a value of zero when position $X_{MIN}$ is at MR2 and a value of 5 volts when position $X_{MAX}$ is at MR2. Hence, $$(R_2-R_3)/(R_1-R_3)=V_{OUT}/K \quad (11)$$

and equations (2) and (3) may be expressed as:

$$X_X=X_{MIN}+(X_{MAX}-X_{MIN})V_{OUT}/K \quad (2'')$$

and $$X_X=(X_{MAX}-X_{MIN})V_{OUT}/K \quad (3'')$$

Thus, since the gain K and the range $X_{MAX}-X_{MIN}$ are known, the position $X_X$ can be determined from the voltage $V_{OUT}$. In the example of FIG. 3, the order in which MR1, MR2, and MR3 are connected (i.e. MR1 to MR3 to MR2) is important. Other possibilities will be appreciated by those skilled in the art and may require the use of additional differential amplifiers or OP AMPS.

Figure 4:
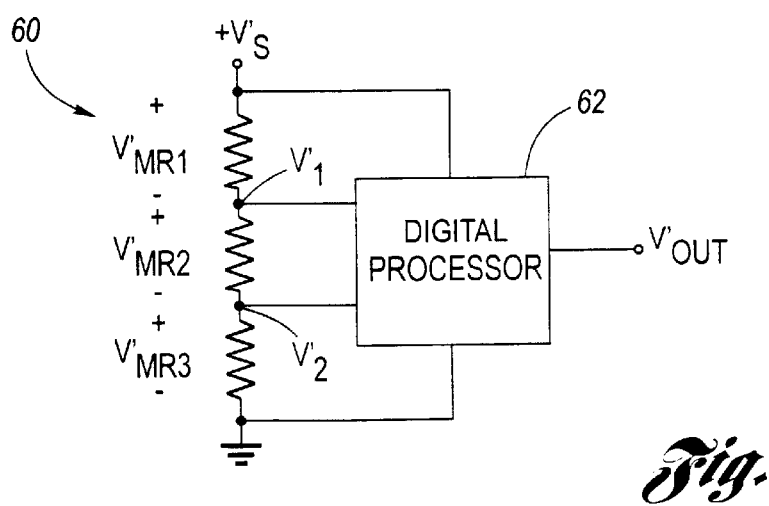
FIG. 4 shows an example of a circuit employing a digital processor implementing the present invention.

FIG. 4 shows an example of a circuit 60 employing a digital processor 62 (i.e. digital signal processor, microcontroller, microprocessor, etc.) for implementing the present invention. In FIG. 4, $R_1'$, $R_2'$, and $R_3'$ are the resistances of MR1, MR2, and MR3, respectively. $V_S'$ is the value of the supply voltage and is implicitly known to the digital processor 62, for example, as an input or stored in the digital processor's memory. The position range, $X_{MIN}$ and $X_{MAX}$ are, preferably, stored in memory also. The values of $V_1'$ and $V_2'$ are input to the digital processor 62 and can be expressed as:

$$V_1' = V_S'^*(R_2'+R_3')/(R_1'+R_2'+R_3') \quad (12)$$

and $$V_2' = V_S'^*R_3'/(R_1'+R_2'+R_3') \quad (13)$$

wherein $V'_{MR1}$, $V'_{MR2}$, and $V'_{MR3}$ are the values of the voltages across MR1, MR2, and MR3, respectively, and can be expressed as:

$$V'_{MR1} = V_S'V_1' \quad (14)$$

$$V'_{MR2} = V_1'V_2' \quad (15)$$

and $$V_{MR3}V_2'. \quad (16)$$

The value of the output voltage $V'_{OUT}$ is computed by the digital processor 62 and can be expressed as:

$$V'_{OUT} = K'^*(V'_{MR2}-V'_{MR3})/(V'_{MR1}-V'_{MR3}) \quad (17)$$

wherein K' is the gain and is adjusted for maximum sensitivity or K' is adjusted to satisfy other system requirements. For example, K' may be adjusted such that $V'_{OUT}$ has a value of zero when MR2 is at the position $X_{MIN}$ and a value of 5 volts when MR2 is at the position $X_{MAX}$. Hence, $$(V'_{MR2}-V'_{MR3})/(V'_{MR1}-V'_{MR3}) = V'_{OUT}/K' \quad (18)$$

and equations (2') and (3') may be expressed as:

$$X_X = X_{MIN} + (X_{MAX}-X_{MIN})V'_{OUT}/K' \quad (2''')$$

and $$X_X = (X_{MAX}-X_{MIN})V'_{OUT}/K'. \quad (3''')$$

Thus, since the gain K' and the range $X_{MAX}-X_{MIN}$ are known, the position $X_X$ can be determined from the voltage $V'_{OUT}$.

Figure 5:
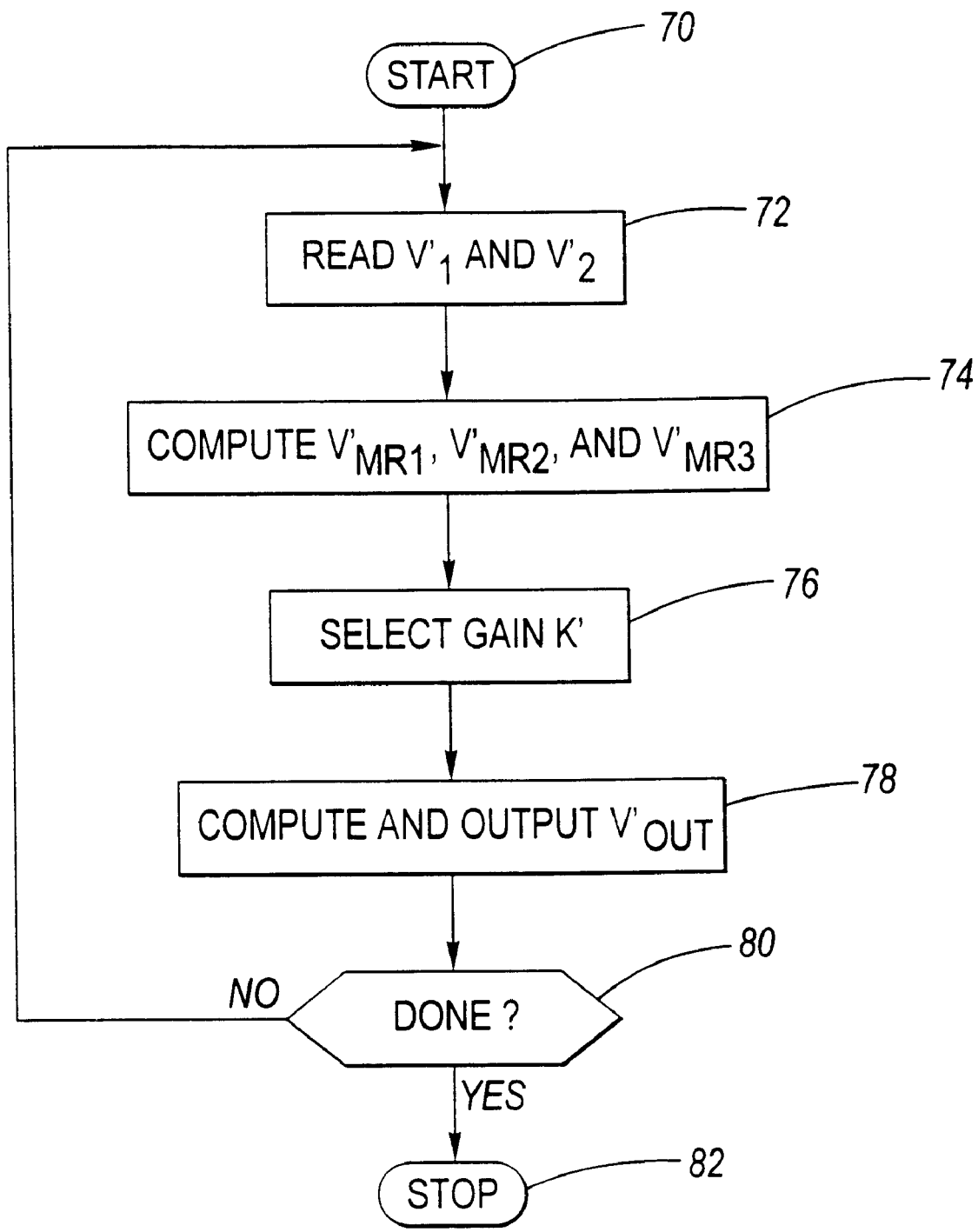
FIG. 5 is a flow diagram for the digital processor of FIG. 4.

FIG. 5 is a flow diagram for the digital processor 62 of FIG. 4. The procedure starts at block 70 where initialization of the digital processor 64 is accomplished. At block 72 the values of $V_1'$ and $V_2'$ are entered into the digital processor 62 and the values of $V'_{MR1}$, $V'_{MR2}$, and $V'_{MR3}$ are computed at block 74 according to equations (14), (15), and (16). The gain K' is selected at block 76 and the output voltage $V'_{OUT}$ is computed and output at block 78. $V'_{OUT}$ is computed according to equation (17). If at decision block 80 the procedure is not done, then control passes to block 72. Otherwise, the procedure ends at block 82. If desired, the value of $X_X$ may be computed according to equation (2''') or (3''') and output as well. The method of accomplishing this would involve another computation block being implemented in FIG. 5, and is well known to those skilled in the art.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A sensor system comprising:
   a first magnetoresistor;
   a second magnetoresistor;
   a third magnetoresistor, wherein said first, second and third magnetoresistors are mutually matched and mutually arranged linearly along an axis wherein said second magnetoresistor is located between said first and third magnetoresistors;
   a bias magnetic field; and
   a magnetic target having a predetermined magnetic irregularity, wherein said target is movable adjacent said first, second and third magnetoresistors along said axis between a predetermined maximum position and a predetermined minimum position such that the bias magnetic field and magnetic irregularity mutually always provide a maximum magnetic field value at said first magnetoresistor and provide a minimum magnetic field value at said third magnetoresistor;
   wherein said bias magnetic field is substantially a linear function of position with respect to said magnetic irregularity between said predetermined maximum and minimum positions along, said axis.

2. The sensor system of claim 1, wherein position of said target relative to said second magnetoresistor along said axis is defined by:

$$X_X = X_{MIN} + (X_{MAX}-X_{MIN})(R_2-R_3)/(R_1-R_3),$$

wherein $X_X$ is the position, $X_{MIN}$ is the predetermined minimum position, $X_{MAX}$ is the predetermined maximum position, $R_1$ is a resistance of the first magnetoresistor, $R_2$ is a resistance of the second magnetoresistor, and $R_3$ is a resistance of the third magnetoresistor.

3. The sensor system of claim 2, wherein said magnetic irregularity is a selectively shaped tooth edge profile.

4. The sensor system of claim 2, further comprising electrical circuit means connected with said first, second and third magnetoresistors for providing a voltage across said first, second and third magnetoresistors which is responsive to the position of said target.

5. The sensor system of claim 4, wherein the position is defined by:

$$X_X = X_{MIN} + (X_{MAX}-X_{MIN})(V_{MR2}-V_{MR3})/(V_{MR1}-V'MR3)$$

wherein $V_{MR1}$ is a voltage across said first magnetoresistor, $VMR_{MR2}$ is a voltage across said second magnetoresistor, and $V_{MR3}$ is a voltage across said third magnetoresistor.

6. The sensor system of claim 5, wherein said electrical circuit comprises a source of voltage, a plurality of resistors, a first comparator, a second comparator and a voltage divider mutually connected with said first, second and third magnetoresistors such that said voltage divider provides a voltage output, $V_{OUT}$, wherein the position is defined by:

$$X_X = X_{MIN} + (X_{MAX}-X_{MIN})V_{OUT}/K,$$

wherein K is a predetermined gain of the voltage divider.

7. The sensor system of claim 6, wherein said magnetic irregularity is a selectively shaped tooth edge profile.

8. The sensor system of claim 4, wherein said electrical circuit comprises a source of voltage, a digital processor connected with said first, second and third magnetoresistors such that said digital processor provides a voltage output, $V_{OUT}$, responsive to the position of said target.

9. The sensor system of claim 8, wherein the position is defined by:

$$X_X = X_{MIN} + (X_{MAX} - X_{MIN})V_{OUT}/K,$$

wherein K is a predetermined gain of the digital processor.

10. The sensor system of claim 9, wherein said magnetic irregularity is a selectively shaped tooth edge profile.

11. A method for determining position of a target having a magnetic irregularity relative to a magnetic position sensor, the magnetic sensor comprising first, second, and third magnetoresistors sequentially arranged along an axis, wherein the target is movable adjacent the first, second and third magnetoresistors along the axis between a predetermined maximum position, $X_{MAX}$, and a predetermined minimum position, $X_{MIN}$, such that a bias magnetic field and the magnetic irregularity mutually always provide a maximum magnetic field value at the first magnetoresistor and provide a minimum magnetic field value at the third magnetoresistor, wherein said bias magnetic field is substantially a linear function of position with respect to said magnetic irregularity between said predetermined maximum and minimum positions along said axis, and wherein a digital processor is connected with the first, second and third magnetoresistors, said method comprising the steps of:

determining a first voltage between the first and second magnetoresistors and a second voltage between the second and third magnetoresistors;

computing a voltage, respectively, across each of said first, second and third magnetoresistors, wherein the voltage across the first magnetoresistor, $V_{MR1}$, is equal to a source voltage minus the first voltage, the voltage across the second magnetoresistor, $V_{MR2}$, is equal to the first voltage minus the second voltage, and the voltage across the third magnetoresistor, $V_{MR3}$, is equal to the second voltage;

selecting a gain, K, of the digital processor;

computing an output voltage, $V_{OUT}$, wherein $$V_{OUT} = K(V_{MR2} - V_{MP3})/(V_{MR1} - V_{MR3});$$

and computing the position, $X_X$, wherein $$X_X = X_{MIN} + (X_{MAX} - X_{MIN})V_{OUT}/K.$$

* * * * *